US006249725B1

(12) United States Patent
Dziedzioch et al.

(10) Patent No.: US 6,249,725 B1
(45) Date of Patent: Jun. 19, 2001

(54) METHOD OF CONTROLLING AT LEAST ONE STATION DISPLAY AND A CENTRAL CONTROL STATION

(75) Inventors: Werner Dziedzioch; Helmut Kauer, both of Vienna (AT)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/181,527

(22) Filed: Oct. 28, 1998

(30) Foreign Application Priority Data

Oct. 28, 1997 (DE) ..... 197 47 446

(51) Int. Cl.[7] ..... G05D 1/00

(52) U.S. Cl. ..... 701/27; 701/200; 340/915; 340/988

(58) Field of Search ..... 701/27, 200, 207, 701/211, 117; 340/907, 910, 915, 988, 992, 994; 342/457

(56) References Cited

U.S. PATENT DOCUMENTS 4,799,162 * 1/1989 Shinkawa et al. ..... 701/117

FOREIGN PATENT DOCUMENTS 4214067 11/1993 (DE) .
195 15 809 10/1996 (DE) .
2-82398 3/1990 (JP) .
2-82399 3/1990 (JP) .

OTHER PUBLICATIONS

"Moderne Informationstechniken Stossen auf Grosses Interesse", J. Burmeister, *Nahverkehrs–praxis,* No. 2, 1996, pp. 6–11, No Month.

"Fahrgastinformation im Landlichen Raum", H. Dobeschinsky et al, *Nahverkehrs–praxis* No. 2, 1996, pp. 12–16, No Month.

Patent Abstracts of Japan P–1303, Jan. 27, 1992, vol. 16, No. 32, for Japanese 3–241500 Oct. 28, 1991.

Patent Abstracts of Japan P–1571, Jul. 9, 1993, vol. 17, No. 366, and Japanese 5–54296, Mar. 5, 1993.

Patent Abstracts of Japan P–1194, Apr. 23, 1991, vol. 15, No. 162, and Japanese 3–29098 Feb. 7, 1991.

Patent Abstracts of Japan P–1116, Oct. 15, 1990, vol. 14, No. 472, and Japanese 2–187899, Jul. 24, 1990.

Patent Abstracts of Japan P 1098, Aug. 29, 1990, vol. 14, No. 400, and Japanese 2–152000, Jun. 11, 1990.

* cited by examiner

*Primary Examiner*—William A. Cuchlinski, Jr.
*Assistant Examiner*—Yonel Beaulieu
(74) *Attorney, Agent, or Firm*—Ware, Fressola, Van Der Sluys & Adolphson LLP

(57) ABSTRACT

In a method of controlling at least one station display (1), where a vehicle (2) transmits its actual location ($x_1$) to a central control station which calculates the estimated waiting time ($t_w$) until the vehicle (2) reaches the station ($x_2$), and controls the station display (1) to visually signal this waiting time ($t_w$) to improve the accuracy of the indicated waiting time ($t_w$), it is provided that the waiting time ($t_w$) of a number (n) of immediately preceding vehicles (3, 4, . . . ) is calculated as a function of the trend line of the actual travel times ($t_1, t_2, \ldots t_m, t_{m+1} \ldots t_n$).

4 Claims, 2 Drawing Sheets

METHOD OF CONTROLLING AT LEAST ONE STATION DISPLAY AND A CENTRAL CONTROL STATION

BACKGROUND OF THE INVENTION

1. Technical Field

The invention concerns a method of controlling at least one station display, where a vehicle transmits its current location to a central control station which calculates the estimated waiting time until the vehicle reaches the station, and controls the station display to visually signal this waiting time, as well as a central control station with a computer for calculating the estimated travel time of a vehicle along a defined line segment between two locations.

2. Discussion of Related Art

The signal of the waiting time until the next vehicle arrives in a station, particularly a bus or a streetcar of the local public passenger transportation system, is usually based on the momentary distance of the vehicle from the station. However, the cyclic changes in the traffic density during the day, the week or even spontaneously, lead to different travel times between a particular location and the station.

SUMMARY OF INVENTION

The object of the invention is to propose a generic type of method which enables a more accurate calculation of the estimated waiting time.

According to a first aspect of the invention, the waiting time is calculated as a function of the trend line of actual travel times of a number of immediately preceding vehicles. In principle the solution is based on considering not only the dependence on the location, but also the actual time used by immediately preceding vehicles, to travel from this location to the station. This has the advantage that a realistic waiting time until the next vehicle arrives is signalled to the passenger during traffic blockages. The passenger can rely on the indicated waiting time, so that an improvement of the user-friendliness is achieved in the end, thereby increasing the acceptance of the local public passenger transportation system.

According further to the first aspect of the invention, the number of the vehicles being considered is reduced when the trend changes. With a constant trend, for example with a steady increase in the traveling time, as many vehicles as possible are being considered, while fewer vehicles are included in the prediction, for example during a decrease or a reversal of the trend. In this way a quick adaptation to the actual traffic conditions is made possible.

According to a second aspect of the present invention, a central control station as described above is characterized in that the computer has storage means for storing the actual travel times of a maximum number of vehicles which immediately preceded along the line segment, and reference means for determining a trend line of a predetermined number of immediately preceding vehicles, as well as evaluation means for the trend-line-dependent calculation of the estimated travel time of the vehicle. These features are provided to improve the accuracy of the travel time calculation. It allows to compare the actual travel time of the last vehicles which traveled along this section of the path, and a derivation of a mathematical sequence in the form of a trend line.

In further accord with the second aspect of the invention, the reference means contain a selection circuit for establishing the number of the vehicles being considered, as a function of the trend line's constancy. The selection circuit determines the number of sequential elements, where a deviation from the last measured value outside of a predetermined variational width leads to a reduction in the number of sequential elements being considered. In the event a trend reversal is determined, i.e., a reduction in the travel time along a predetermined section of the path takes place instead of an increase in the travel time, the number of measured values used to form the sequence can be reduced to one or two.

In still further accord with the second aspect of the invention, the central control station is for use in a traffic routing system. In the widest sense, this traffic routing system is a monitoring and control system for any vehicular fleet. It could be imagined to route the traffic of a fleet of trucks for example, in this case with the possibility of providing corresponding changes in the travel routes and travel times in the event of a distinct trend line toward a traffic jam and full backup. Such flexible traffic routes and travel times can also be advantageous for bus routing systems. In addition to routing the individual travel path of buses, the control of a station display in further accord with the second aspect of the invention, is for signalling the estimated waiting time to a potential passenger, which can be an advantage for the potential passenger. A further application possibility of the claimed central control station is provided by the statistical evaluation of the measured values over a longer period of time, in order to derive therefrom a realistic timetable for a predetermined line segment which is composed of evaluated path sections.

BRIEF DESCRIPTION OF THE DRAWING

The invention will be explained in the following by means of an embodiment that is illustrated by the figures.

DETAILED DESCRIPTION OF PREFERRED EMBODIMENTS

Figure 1:
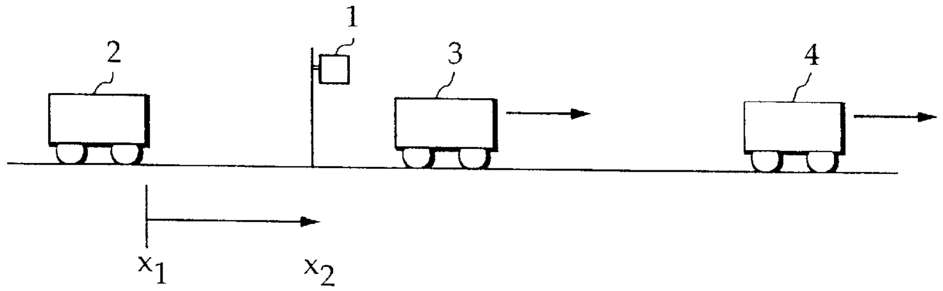
FIG. 1 shows a vehicle 2 approaching a station display 1.

As mentioned, FIG. 1 shows a vehicle 2 approaching a station display 1. The waiting time $t_w$, until vehicle 2 arrives at the point $x_2$ of the station where the station display 1 is located, changes in the course of the day due to changing traffic situations. In order to predict the waiting time $t_W$ for the vehicle 2 approaching the station, the actual travel times $t_1, t_2, \ldots t_m, t_{m+1} \ldots t_n$ of a number n of vehicles 3, 4 . . . which had just traveled along the line segment between $x_1$ and $x_2$, are obtained and used for the calculation in accordance with the following example:

| | | | |
|---|---|---|---|
| • | $t_3$ | 130 sec. | 13:25 o'clock at point $x_1$ |
| • | $t_2$ | 140 sec. | 13:34 o'clock at point $x_1$ |
| • | $t_1$ | 145 sec. | 13:44 o'clock at point $x_1$ |

At 13:55 o'clock the trend line, which shows an increasingly slowing travel time, results in a remaining travel time of about 148 sec. to the station $x_2$. This example is based on three measured values. However, the number n of the measured values used for the prediction is dynamically changed as follows:

With a trend that remains constant, e.g., when travel times $t_m$, $t_{m+1}$. . . $t_2$, $t_1$ are increasing, the number n of the last measured values corresponding to this trend is used.

With a changing trend, the number of immediately preceding measured values being considered is strongly reduced in order to adapt the prediction more quickly to the changing trend.

Figure 3:
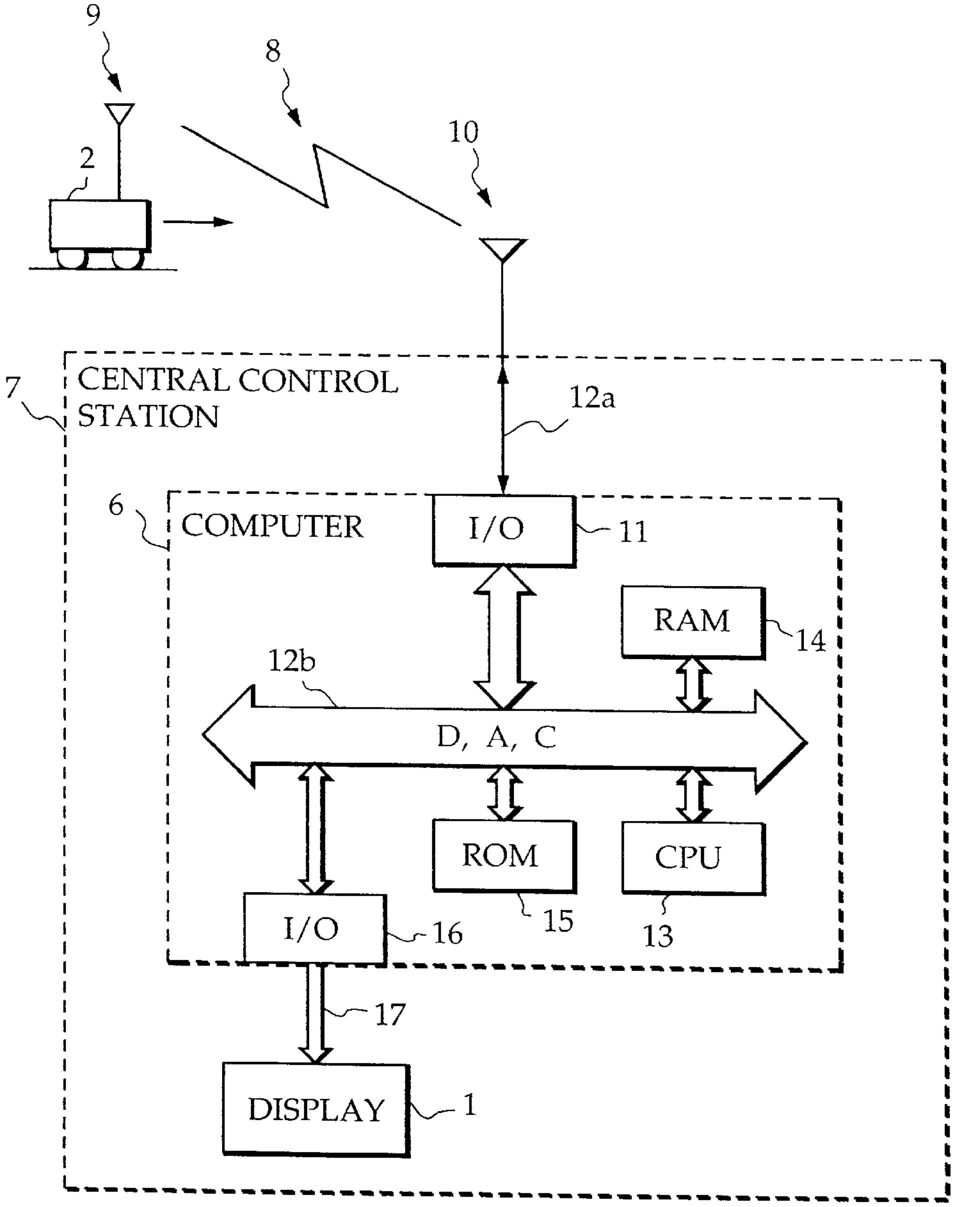
FIG. 3 shows a central control station with a computer for calculating the estimated travel time of a vehicle along a defined line segment between two locations, according to the present invention.
Figure 2:
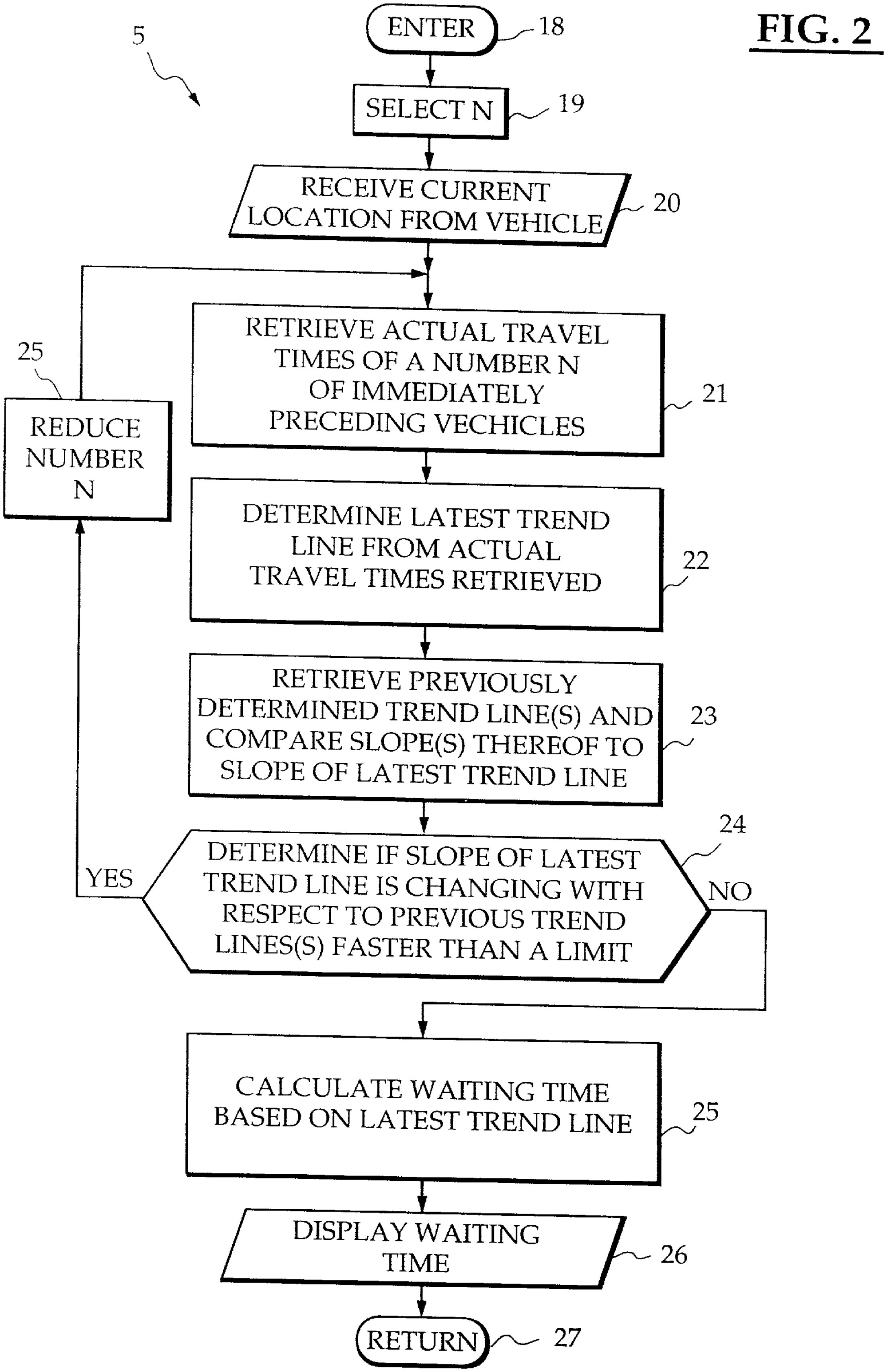
FIG. 2 shows a method of controlling at least one station display, where a vehicle transmits its current location to a central control station which calculates the estimated waiting time until the vehicle reaches the station, and controls the station display to visually signal this waiting time, according to the present invention.

FIG. 2 shows a sequence of steps 5 which may be carried out on a computer, such as a computer 6 shown in a central station 7 in FIG. 3 and including the display 1 of FIG. 1 for viewing by intending passengers. The method 5 of FIG. 2 is for controlling the at least one station display 1, where the vehicle 2 transmits its current location $x_1$ to the central control station 7 by means, for example, of a radio link 8 established between antennas 9, 10 on the vehicle 2 and the central control station 7. The computer 6 within the central station 7 shown in FIG. 3 includes an input-output interface 11, which is connected to the antenna 10 by a signal line 12 and which communicates information within the computer 6 over a data, address and control bus 12, which is connected in turn to a central processing unit 13, a random access memory 14, and read-only memory 15, and another input-output interface 16, which is in turn connected to the display 1 by a signal line 17. The read-only memory 15 includes a stored set of instructions for carrying out the invention in a series of steps, such as the series of steps 5 illustrated in FIG. 2.

The steps 5 of FIG. 2 can be executed by first entering in a step 18 and then selecting a number n of immediately preceding vehicles to be used as a base line for establishing a trend. The number n can be determined externally from the program steps 5 based on information gathered by another program relating to the number of vehicles that have recently traversed the segment. After that, a step 20 is executed in which the current location of vehicle 2 is received over the radio link 8. The travel times of the number n of immediately preceding vehicles is then retrieved from storage in a step 21, e.g., from the random access memory 14 of the computer 6 of FIG. 3. From these retrieved actual travel times, a determination is made in a step 22 of a latest trend line. In order to be in a position to adapt the prediction more quickly to a changing trend, a step 23 is then executed to retrieve previously-determined trend lines for the purpose of comparing the slopes thereof to the slope of the latest trend line determined in step 22. A determination is then made in a step 24 if the slope of the latest trend line is changing with respect to previous trend lines faster than a limit. If so, a step 25 is executed to reduce the number n and re-execute steps 21, 22, 23, 24, with the possibility of reducing the number n further until it is determined in step 24 that the slope of the latest trend line is not changing with respect to the previous trend lines faster than the limit. In that case, a step 25 is then executed to calculate the waiting time based on the latest trend line. Once calculated, it can be displayed on the display of FIGS. 1 and 3, as indicated in a step 26. A return is then made in a step 27, and the sequence of steps 5 may be re-executed at any time by re-entering at step 18.

The invention is not restricted to the above indicated embodiment. A number of variations can rather be envisioned, which also use the features of the invention even for a basically different configuration.

What is claimed is:

1. A method of controlling at least one station display (1) with enhanced accuracy, where a vehicle (2) transmits its current location ($x_1$) to a central control station which calculates an estimated waiting time ($t_w$) until the vehicle (2) reaches the station ($X_2$), and controls the station display (1) to visually signal this waiting time ($t_w$), characterized in that the waiting time ($t_w$) is calculated as a function of a trend line of actual travel times ($t_i$, $t_2$, . . . $t_m$, $t_{m+1}$ . . . $t_n$) of a number (n) of immediately preceding vehicles (3, 4, . . . ), with the number being reduced when the trend line changes.

2. A central control station with a computer for calculating with enhanced accuracy an estimated travel time ($t_f$) of a vehicle (2) along a defined line segment between two locations ($x_i$ and $X_{i+1}$), characterized in that the computer has:

storage means for storing actual travel times ($t_{f1}$, $t_{f2}$, . . . , $t_{fn}$) of a maximum number of vehicles (3, 4, . . . ) which immediately preceded along the line segment;

reference means for determining a trend line of a predetermined number ($n<N$) of immediately preceding vehicles (3, 4, . . . ) wherein said reference means contains a selection circuit for establishing the number (n) as an increasing function of constancy of the trend line; and evaluation means for calculation, dependent upon the trend line, of the estimated travel time ($t_f$) of the vehicle (2).

3. A central control station as claimed in claim 2, characterized by its use in a traffic routing system.

4. A central control station as claimed in claim 2, characterized by its use as a control of at least one station display (1), where a visual signal is provided of the estimated waiting time ($t_w$) until the vehicle (2) reaches the station ($x_2$).

* * * * *